United States Patent
Hemry et al.

(10) Patent No.: US 10,415,687 B1
(45) Date of Patent: Sep. 17, 2019

(54) TRANSMISSION ADAPTER APPARATUS AND METHOD

(71) Applicants: David Hemry, Gulf Breeze, FL (US); Karen Hemry, Gulf Breeze, FL (US)

(72) Inventors: David Hemry, Gulf Breeze, FL (US); Karen Hemry, Gulf Breeze, FL (US)

(*) Notice: Subject to any disclaimer, the term of this patent is extended or adjusted under 35 U.S.C. 154(b) by 15 days.

(21) Appl. No.: 15/793,038

(22) Filed: Oct. 25, 2017

Related U.S. Application Data (60) Provisional application No. 62/496,648, filed on Oct. 25, 2016.

(51) Int. Cl.
*F16H 57/025* (2012.01)
*G01P 1/02* (2006.01)
*G01M 13/021* (2019.01)

(52) U.S. Cl.
CPC ........ *F16H 57/025* (2013.01); *G01M 13/021* (2013.01); *G01P 1/026* (2013.01)

(58) Field of Classification Search
CPC ..... F16H 57/025; G01M 13/021; G01P 1/026
See application file for complete search history.

(56) References Cited

U.S. PATENT DOCUMENTS

| | | | | |
|---|---|---|---|---|
| 4,744,436 A * | 5/1988 | Uchiyama | ............... | B60K 17/34 180/233 |
| 5,063,345 A * | 11/1991 | Akiyama | ................ | B60T 8/171 324/173 |
| 5,267,488 A * | 12/1993 | Hardennan | ............ | B60K 17/02 180/347 |
| 7,194,932 B1 * | 3/2007 | Costello | ............... | B60K 17/344 74/606 R |
| 2010/0326226 A1 * | 12/2010 | Walston | ................. | B60K 17/08 74/473.36 |
| 2014/0121920 A1 * | 5/2014 | Shultz | ..................... | F16H 61/68 701/56 |
| 2014/0188355 A1 * | 7/2014 | Kresse | ................. | F16H 61/0213 701/54 |
| 2014/0236440 A1 * | 8/2014 | Etchason | ............ | F16H 61/0213 701/60 |

\* cited by examiner

*Primary Examiner* — Vicky A Johnson
(74) *Attorney, Agent, or Firm* — J. Nevin Shaffer, Jr.

(57) ABSTRACT

A transmission adapter apparatus and method includes an adapter with a first side and a second side, an inside and an outside, and a circumferential edge with a width surrounding a hollow center with a diameter. A speed sensor receiver is provided in the circumferential edge from the outside to the inside with an opening from the outside into the hollow center where the speed sensor receiver is configured to receive and retain a speed sensor and where the speed sensor receiver is perpendicular to a centerline through the hollow center of the adapter. A speed sensor retainer lip is provided in the receiver such that a speed sensor located in the speed sensor receiver is retained at a selected distance from the hollow center of the adapter. Holes are provided in the adapter where the holes are configured to align with a transmission housing and a transfer housing. A coupler is provided that is configured to fit within the hollow center of the adapter where the coupler includes a first end and a second end where the first end is connectable with a transmission in the transmission housing and where the second end is connectable with a transfer case in the transfer housing.

20 Claims, 8 Drawing Sheets

TRANSMISSION ADAPTER APPARATUS AND METHOD

CROSS REFERENCE TO RELATED APPLICATION

This application claims the benefit of previously filed U.S. provisional patent application No. 62/496,648 filed Oct. 25, 2016 for an "Adapter with a speed sensor provision for Allison four wheel drive transmission to any transfer case without an OEM speed sensor provision". The Applicant hereby claims the benefit of this provisional application under 35 U.S.C. § 119. The entire content of this provisional application is incorporated herein by this reference.

FIELD OF THE INVENTION

This invention relates to an improved transmission adapter device including an adapter with a first side and a second side, an inside and an outside, and a circumferential edge with a width surrounding a hollow center with a diameter. A speed sensor receiver is provided in the circumferential edge from the outside to the inside with an opening from the outside into the hollow center where the speed sensor receiver is configured to receive and retain a speed sensor and where the speed sensor receiver is perpendicular to a centerline through the hollow center of the adapter. A speed sensor retainer lip is provided in the receiver such that a speed sensor located in the speed sensor receiver is retained at a selected distance from the hollow center of the adapter. Holes are provided in the adapter where the holes are configured to align with a transmission housing and a transfer housing. A coupler is provided that is configured to fit within the hollow center of the adapter where the coupler includes a first end and a second end where the first end is connectable with a transmission in the transmission housing and where the second end is connectable with a transfer case in the transfer housing.

BACKGROUND OF THE INVENTION

A problem exists in the field of automobiles with regard to providing the functionality of one vehicle with the machinery of another. For example only, and not by way of limitation, in order for a four wheel drive to function properly in after market applications in vehicles that were not manufactured using an ALLISON brand 1000/2000 style transmission, the state of the art now is to drill into the transmission or the transfer case to add a speed sensor. This seriously degrades the structural integrity of these highly precise pieces of machinery and if done yields uncertain results.

Thus, there is a need in the art for the provision of a device that enables the upgrading of functionality of unmatched transmissions and transfer cases without degrading the structural integrity of either the transmission or the transfer case.

It therefore is an object of this invention to provide an adapter device that allows the addition of a speed sensor without the requirement of violating the structural integrity of pre-existing elements of an automobile.

SUMMARY OF THE INVENTION

Accordingly, the transmission adapter apparatus and method of the present invention, according to one embodiment, includes an adapter with a first side and a second side, an inside and an outside, and a circumferential edge with a width surrounding a hollow center with a diameter. A speed sensor receiver is provided in the circumferential edge from the outside to the inside with an opening from the outside into the hollow center where the speed sensor receiver is configured to receive and retain a speed sensor and where the speed sensor receiver is perpendicular to a centerline through the hollow center of the adapter. A speed sensor retainer lip is provided in the receiver such that a speed sensor located in the speed sensor receiver is retained at a selected distance from the hollow center of the adapter. Holes are provided in the adapter where the holes are configured to align with a transmission housing and a transfer housing. A coupler is provided that is configured to fit within the hollow center of the adapter where the coupler includes a first end and a second end where the first end is connectable with a transmission in the transmission housing and where the second end is connectable with a transfer case in the transfer housing.

All terms used herein are given their common meaning so that "speed sensor" identifies and describes a device for measuring the speed of a moving part as is known in the automotive art and not described more fully hereafter. Likewise "transmission", "transmission housing". "transfer housing" and "transfer case" are all used to describe elements common in the automotive art and to those of ordinary skill.

In one aspect, the apparatus further includes an alignment edge surrounding the hollow center on at least one side of the adapter where the alignment edge is configured to connect with the housings so as to align the adapter with the housings.

In another aspect, the coupler includes a female end and a male end. In one aspect, the coupler includes two female ends.

In a further aspect, the transmission housing includes a tail housing and where the transfer housing includes a front housing and where the coupler is connectable with the tail housing on one end and with the front housing on another end.

In one aspect, the speed sensor retainer lip is configured to hold a speed sensor approximately one-eighth of an inch from the hollow center.

In one aspect, the transmission is an ALLISON brand transmission and in another aspect the transmission is a FORD brand transmission.

In one aspect, the apparatus includes a tone ring where the tone ring is configured to fit within the adapter and rotate underneath the speed sensor receiver.

According to another embodiment, a transmission adapter apparatus consists of an adapter with a first side and a second side, an inside and an outside, and a circumferential edge with a width surrounding a hollow center with a diameter. A speed sensor receiver is provided in the circumferential edge from the outside to the inside with an opening from the outside into the hollow center where the speed sensor receiver is configured to receive and retain a speed sensor and where the speed sensor receiver is perpendicular to a centerline through the hollow center. A speed sensor retainer lip is provided in the speed sensor receiver such that a speed sensor located in the speed sensor receiver is retained at a selected distance from the hollow center. Holes are located in the adapter where the holes are configured to align with a tail housing of a transmission housing and a front housing of a transfer housing. A coupler is configured to fit within the hollow center of the adapter where the coupler includes a first end and a second end where the first end is connectable with the trail housing and a transmission in the transmission housing and where the second end is connectable with the front housing with a transfer case in the transfer housing and a tone ring is provided where the tone ring is configured to fit within the adapter and rotate underneath the speed sensor receiver.

In one aspect, the apparatus further includes an alignment edge surrounding the hollow center on at least one side of the adapter where the alignment edge is configured to connect with the housings so as to align the adapter with the housings.

In another aspect, the coupler includes a female end and a male end and in one aspect the coupler includes two female ends.

In a further aspect, the speed sensor retainer lip is configured to hold a speed sensor approximately one-eighth of an inch from the hollow center.

In one aspect, the transmission is selected from a group of transmissions consisting of: an ALLISON brand transmission and a FORD brand transmission.

According to another embodiment, a transmission adapter method consists of:

a. providing an adapter with a first side and a second side, an inside and an outside, and a circumferential edge with a width surrounding a hollow center with a diameter; a speed sensor receiver in the circumferential edge from the outside to the inside with an opening from the outside into the hollow center where the speed sensor receiver is configured to receive and retain a speed sensor and where the speed sensor receiver is perpendicular to a centerline through the hollow center; a speed sensor retainer lip in the speed sensor receiver such that a speed sensor located in the speed sensor receiver is retained at a selected distance from the hollow center; holes in the adapter where the holes are configured to align with a transmission housing and a transfer housing; a coupler configured to fit within the hollow center of the adapter where the coupler includes a first end and a second end where the first end is connectable with a transmission in the transmission housing and where the second end is connectable with a transfer case in the transfer housing; and b. connecting the adapter and the coupler with the transmission and transfer case with a tone ring located in the adapter perpendicular and adjacent to the speed sensor receiver.

In another aspect, the method further includes an alignment edge surrounding the hollow center on at least one side of the adapter where the alignment edge is configured to connect with the housings so as to align the adapter with the housings.

In one aspect, the transmission housing includes a tail housing and where the transfer housing includes a front housing and where the coupler is connectable with the tail housing on one end and with the front housing on another end.

In a further aspect, the speed sensor retainer lip is configured to hold a speed sensor approximately one-eighth of an inch from the hollow center.

In another aspect, the coupler includes a female end and a male end.

DESCRIPTION OF THE DRAWINGS

Other objects, features and advantages of the present invention will become more fully apparent from the following detailed description of the preferred embodiment, the appended claims and the accompanying drawings in which

DETAILED DESCRIPTION OF THE INVENTION

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 1:
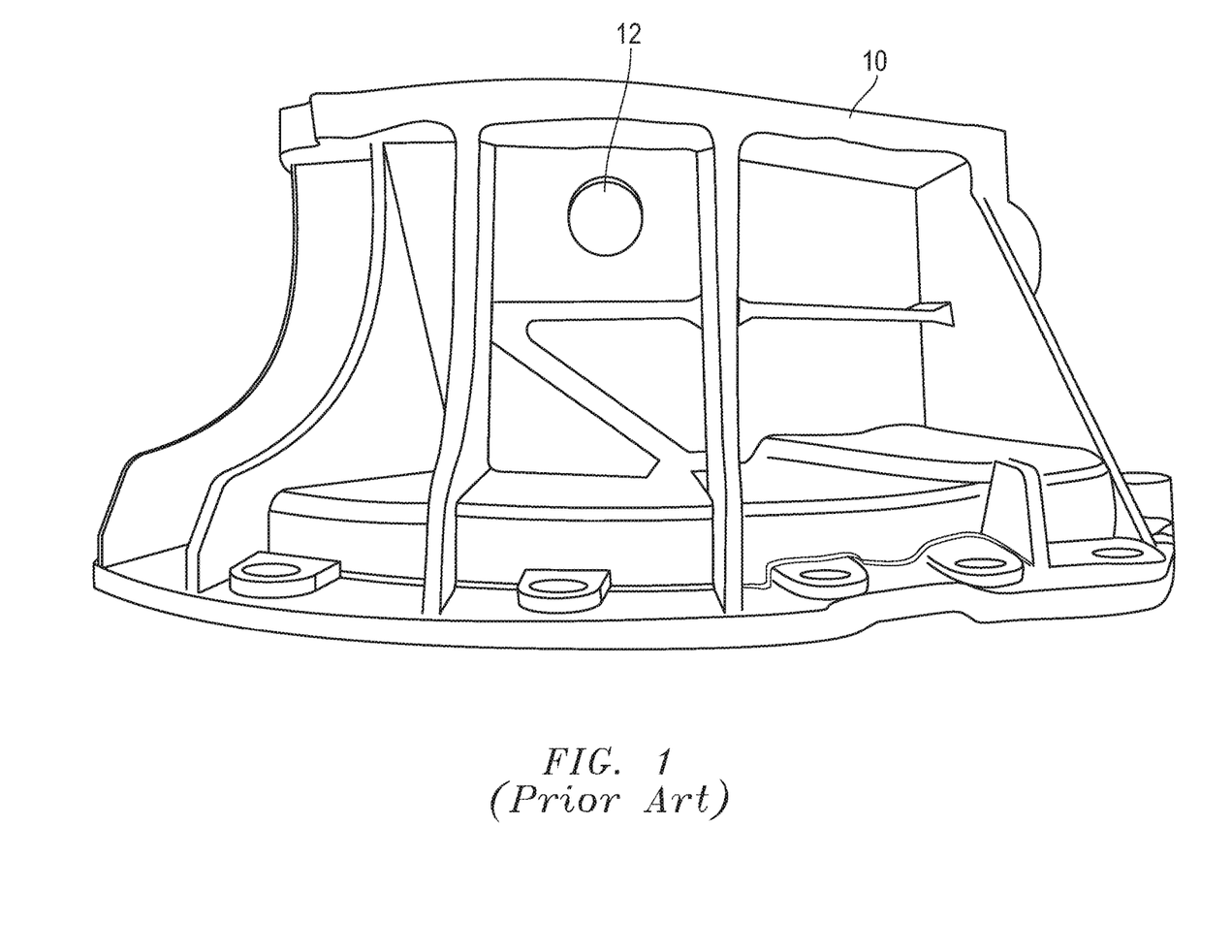
FIG. 1 is a side view of a Prior Art transmission housing with a hole drilled in it for adding a speed sensor.

A preferred embodiment of the present invention is illustrated by way of example in FIGS. 2-9. With specific reference to Prior Art FIG. 1, a tail housing 10, as are known and as are connected to a transmission casing enclosing a transmission (not shown for clarity), is shown with its structure broken by the creation of a cut out 12. Cut out 12 is the prior art solution for adding an after market speed sensor as described above. Clearly the cut out 12 weakens the structure of the tail housing 10. Likewise, if the speed sensor is to be added at the transfer housing (not shown in FIG. 1) the prior art solution of adding a speed sensor by drilling a cut out 12 in the transfer casing weakens that structure as well.

Figure 2:
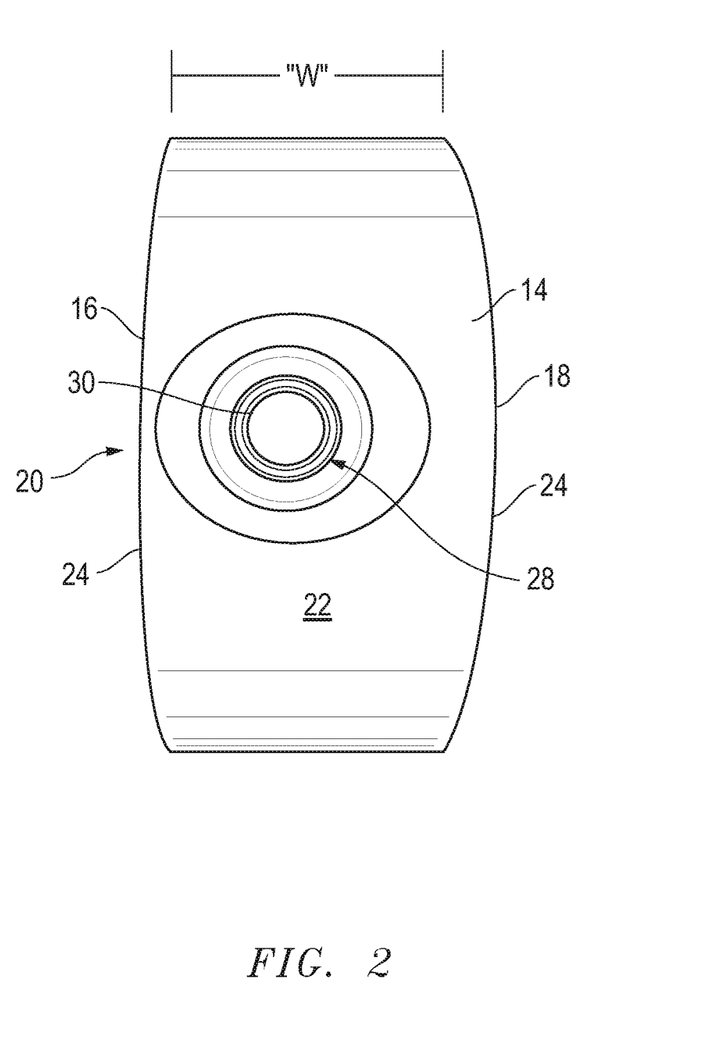
FIG. 2 is a side view of the transmission adapter of the present invention illustrating the speed sensor receiver.
Figure 3:
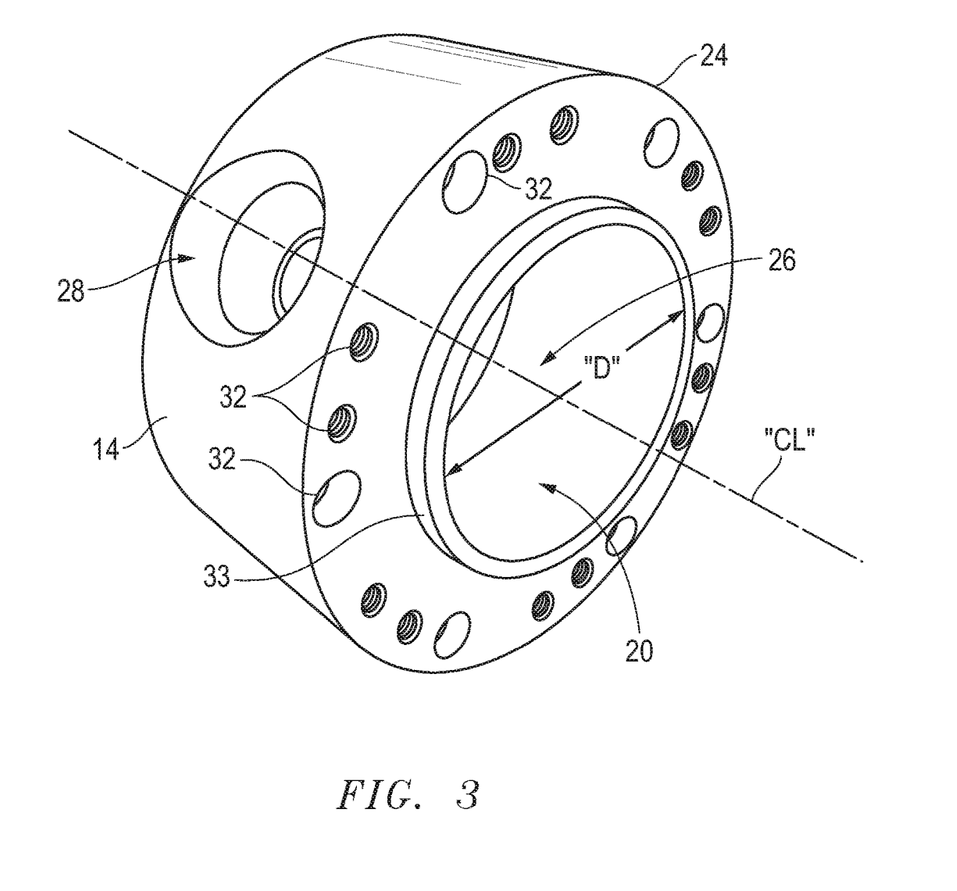
FIG. 3 is a front perspective view of the invention of FIG. 2 illustrating the holes in the adapter and the alignment edge surrounding the hollow center.

Referring now to FIG. 2, adapter 14 includes a first side 16 and a second side 18, an inside 20 and an outside 22, and a circumferential edge 24 with a width, "W", surrounding a hollow center 26 with a diameter, "D" (see FIG. 3)

FIG. 2 also shows speed sensor receiver 28 in the circumferential edge 24. The speed sensor receiver 28 is a hole from the outside 22 to the inside 20 of adapter 14. Speed sensor receiver 28 thus forms an opening from the outside 22 into the hollow center 26. The speed sensor receiver 28 is configured to receive and retain a speed sensor (not shown for clarity and as are known in the art) and, importantly, the speed sensor receiver 28 is formed so as to be perpendicular to a centerline ("CL" as shown in FIG. 3) through the hollow center 28 of adapter 14.

FIG. 2 also illustrates a speed sensor retainer lip 30 in the speed sensor receiver 28, shown in the Figure near the hollow center 26 of adapter 14, such that a speed sensor located in the speed sensor receiver 28 is retained or held or located when installed at a selected distance from the hollow center 26. This distance is determined by the type of transmission involved such that a tone ring (see FIG. 6) can accurately be measured by a speed sensor, as is known in the art. In a preferred embodiment, Applicants have found that a speed sensor retaining lip 30 that hold a speed sensor approximately one-eighth of an inch from the hollow center 26 is preferred. The location of the speed sensor retainer lip 30 may be adjusted, however, to fit the circumstances and equipment involved.

Referring now to FIG. 3, holes 32 in adapter 14 are configured to align with a transmission housing and a transfer housing (not shown). As is known, automobile manufacturers have different connection patterns or schemes or sizes. Thus, Applicants' adapter 14 includes, preferably, holes 32 in a plurality of options or patterns such that no matter whether the equipment is DODGE brand equipment or FORD brand equipment, for example only and not by way of limitation, the adapter 14 is connectable thereto.

FIG. 3 also illustrates an alignment edge 33 surrounding the hollow center 26 on at least one side of the adapter 24. When present the alignment edge 33 is configured to connect with the transmission housing and/or transfer case housings so as to assist in the alignment of the adapter 14 with the housing(s).

Figure 4:
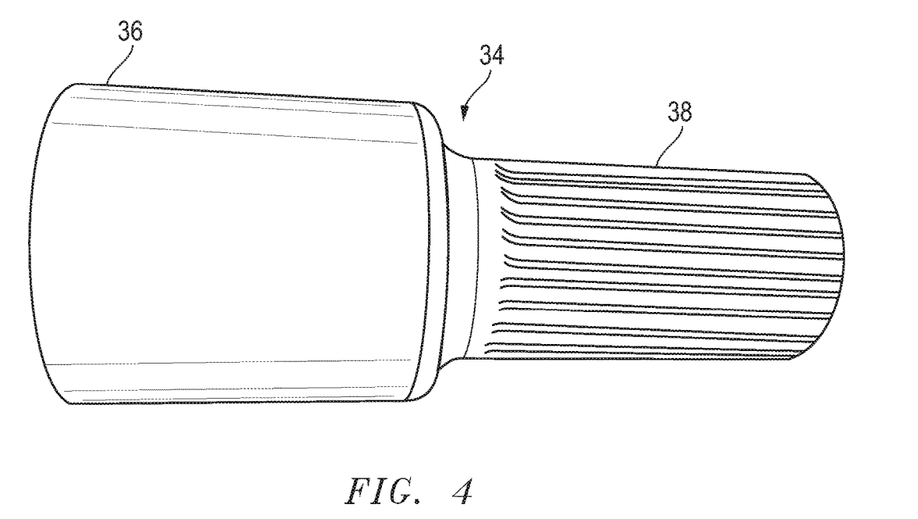
FIG. 4 is a top view of the coupler of the invention of FIG. 2 showing the coupler with a female end and a male, splined, end.
Figure 10:
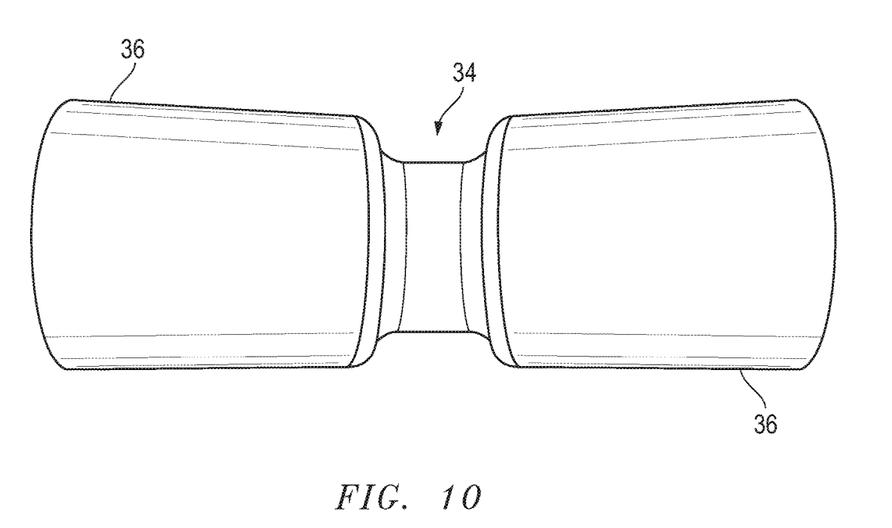
FIG. 10 is a top view of the coupler of the invention of FIG. 4 showing the coupler with two female ends.

Referring now to FIG. 4, a coupler 34 is provided according to the present invention. Coupler 34 is configured to fit within the hollow center 26 of adapter 14 when in use. Coupler 34 includes a first end 36 and a second end 38 where the first end 36 is connectable with a transmission in a transmission housing (see FIG. 5) and where the second end 38 is connectable with a transfer case in a transfer housing (see FIG. 6). Typically, coupler 34 first end 36 will be a "female" end in that first end 36 will receive the output shaft of a transmission and connect with it by way of matching spline configurations on the inside of the first end 36 (not shown) or the like, all as is known in the art. Likewise, typically, the second end 38 of couple 34 is a "male" end in that it is inserted into the input shaft of the transfer case and connected therewith by means of matching spline configurations on the outside of second end 38 as shown in the Figure, for example only and not by way of limitation. In some few cases, as shown in FIG. 10, a coupler with two female ends is required and thus both ends of coupler 34 would look like the first end 36 shown in FIG. 4.

Figure 5:
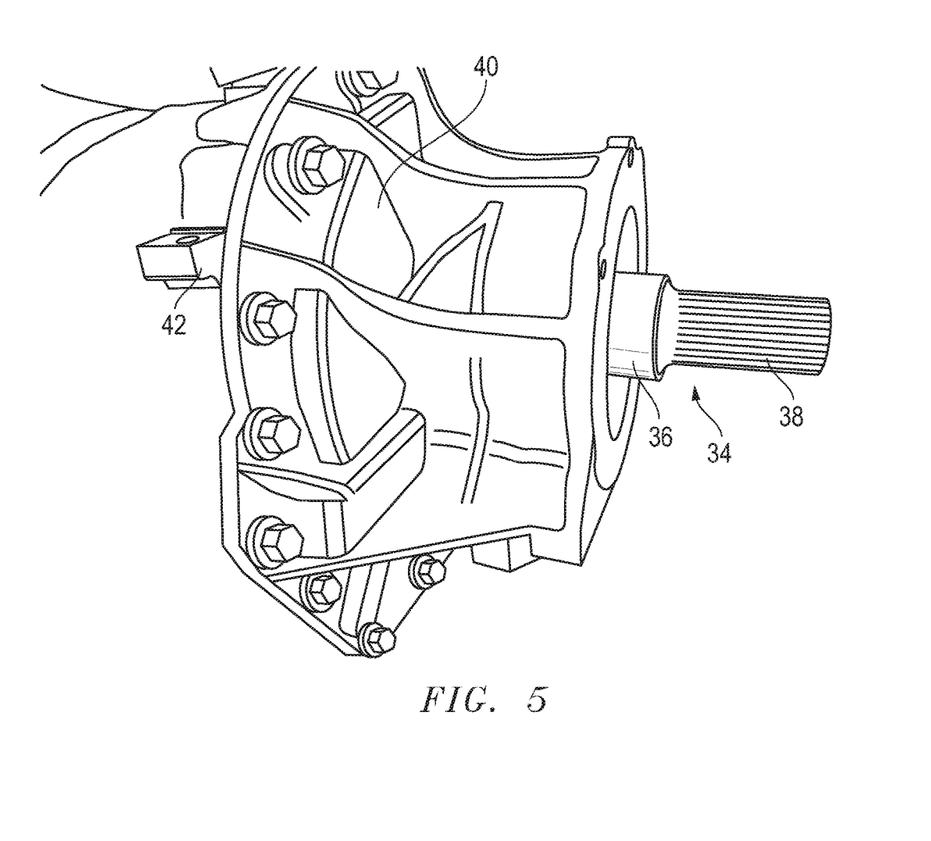
FIG. 5 is a side view of the coupler of FIG. 4 with the female end connected with a transmission in a transmission housing.

FIG. 5 illustrates the coupler 34 connected at the tail housing 40 to the output shaft (not shown) of a transmission (not shown for clarity). Tail housing 40 is connected with transmission housing 42 as is known in the art. In this embodiment first end 36 of coupler 34 is a "female" receptor and second end 38 of coupler 34 is a "male" form.

Figure 6:
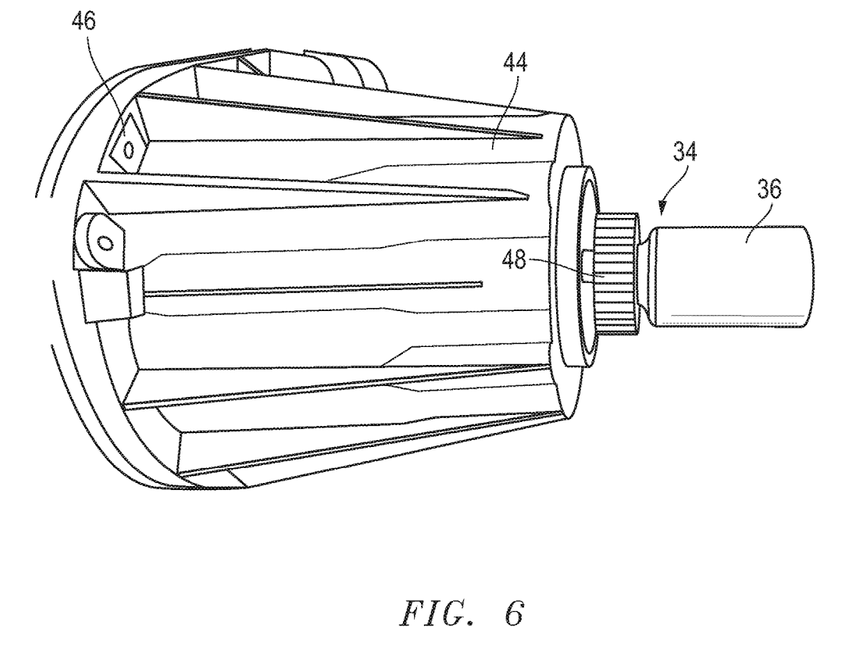
FIG. 6 is a side view of the coupler of FIG. 4 with the male end connected with a transfer case in a transfer housing and with a tone ring installed.

FIG. 6 illustrates the coupler 34 connected at the front housing 44 of a transfer housing 46 covering a transfer case (not shown for clarity) as are known in the art. Here, second end 38 of coupler 34 is a male configuration and is inserted into the input shaft of the transfer case and connected thereto with a matching spline configuration as discussed above.

FIG. 6 also shows reluctor or tone ring 48. Tone ring 48 is connected with the input shaft of the transfer case and rotates as the shaft rotates, as is known, within the adapter 14 and rotate underneath the speed sensor receiver 28. Applicants' tone ring 48 includes notches as shown and when the tone ring 48 rotates it has the correct number of notches such that a speed sensor observes the required number of "pulses" per revolution according to what equipment is involved. In the case of an ALLISON brand transmission, for example only, that number is forty pulses per revolution. FIG. 6 shows the tone ring 48 connected on the outside of the input shaft of the transfer case to which coupler 34 is engaged. Thereafter, adapter 14 is connected over the tone ring 48 such that when assembled, the tone ring 48 rotates one eighth of an inch from a speed sensor in speed sensor receiver 28.

Figure 7:
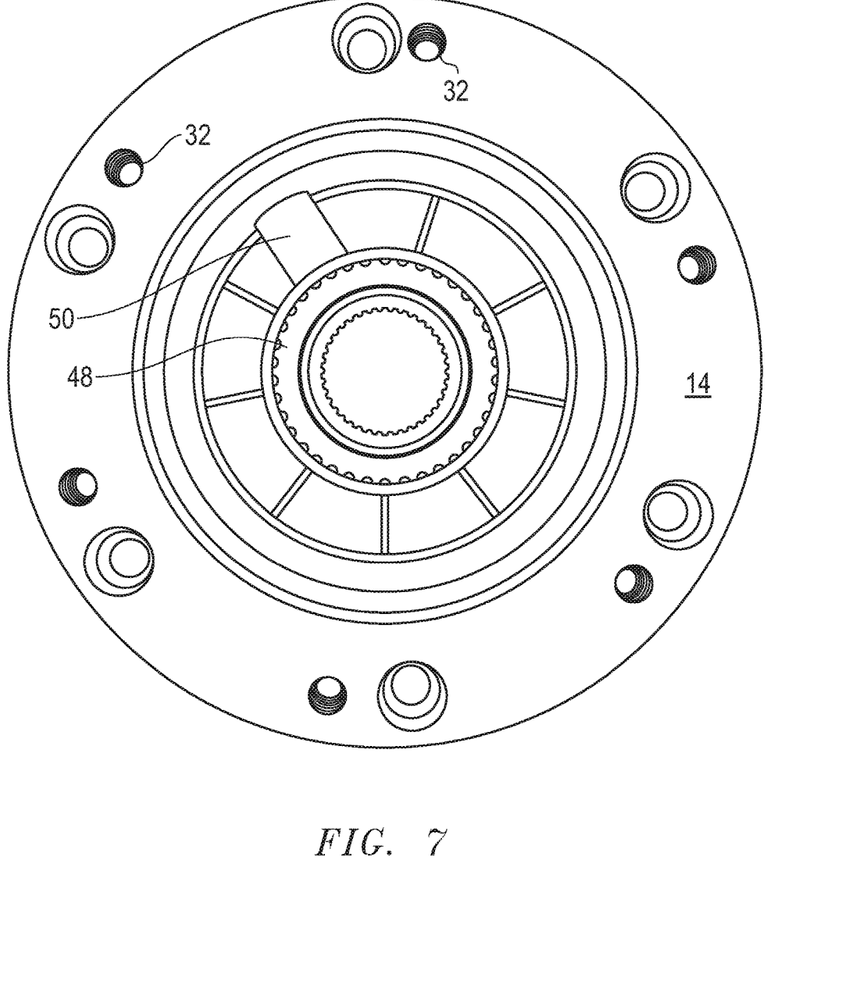
FIG. 7 is an end on perspective view illustrating the tone ring located in the hollow center of the adapter and below a speed sensor.

FIG. 7 shows the ordering of elements of the invention with the tone ring 48 on the outside of the input shaft of a transfer case in other cases the tone ring 48 is attached to the coupler 34. In any case, when installed, tone ring 48 is held directly underneath speed sensor receiver 28 of adapter 14 and speed sensor 50 and thus rotates when assembled directly beneath a speed sensor 50 as shown, preferably an eighth of an inch apart.

Figure 8:
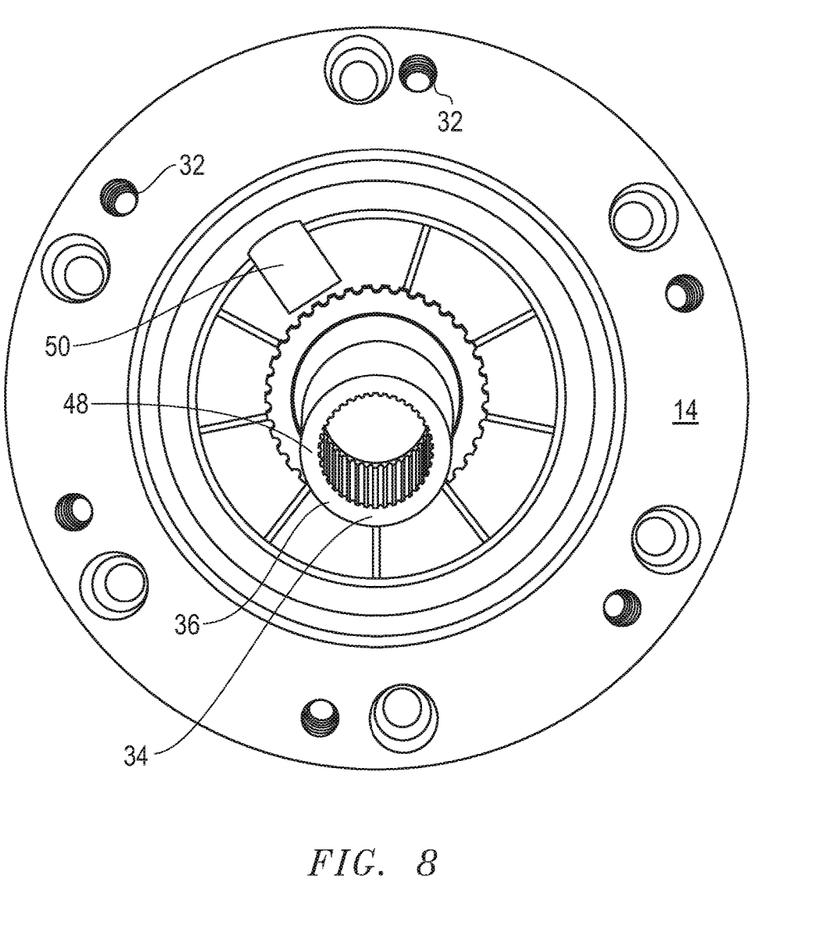
FIG. 8 is an end on perspective view illustrating the tone ring located in the hollow center of the adapter and below a speed sensor with the coupler connected with the input shaft of the transfer case.

FIG. 8 shows the elements of FIG. 7 with the adapter 14 and with coupler 34 inserted into the transfer case input shaft so that the first end 36 of coupler 34 is ready to be matched up with the output shaft of the transmission as discussed above.

Figure 9:
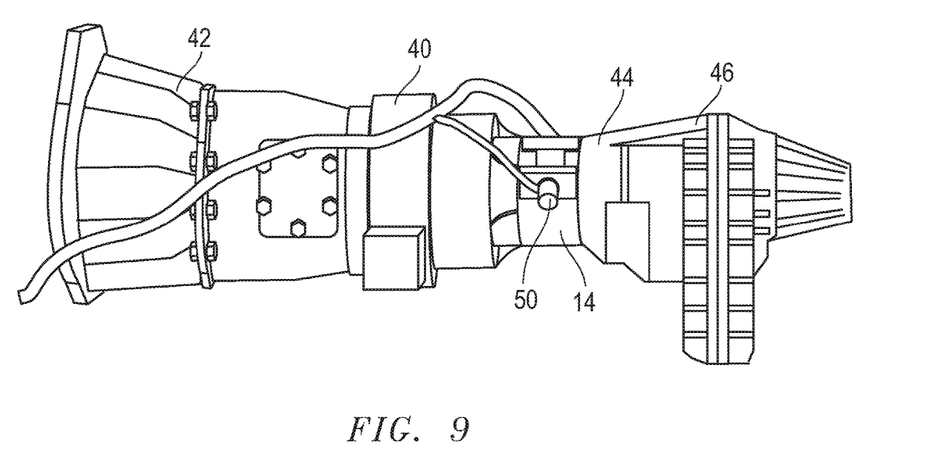
FIG. 9 is a side view of the adapter of FIG. 2 in place connected with a transmission housing on one side and a transfer case on the other and with a speed sensor installed in the speed sensor receiver.

FIG. 9 shows the adapter 14 in place, after installing coupler 34, such that the tail housing 40 and the front housing 44 of the transmission and the transfer case are joined. Tone ring 48, as described above, is located beneath the speed sensor 50 located in speed sensor receiver 28.

By way of further description, in an OEM (original equipment manufacturer) application of a four-wheel drive vehicle with an ALLISON brand 1000/2000 style transmission and OEM transfer case, for example only and not by limitation, the output speed sensor 50 is located (machined)

in the housing of the transfer case. (i.e. General Motors-Ford GENERAL MOTORS brand. FORD brand)

When installing an ALLISON brand transmission into a four wheel drive vehicle that was not manufactured with the an ALLISON brand transmission and transfer case, in order for the non-matching factory installed transfer case and four wheel drive to function as designed, an output speed sensor must be installed somewhere.

Up to this point in time, the state of the art way in which the after market automotive industry has dealt with this issue is to install a reluctor ring (tone ring 48) and speed sensor 50 into either the tail housing 40 of the ALLISON brand transmission or the front or rear housing cover 44 of the non OEM transfer case. In order to accomplish this either the transmission or the transfer case has to be dismantled and custom machine work must be done to install a reluctor ring on either the output shaft of the transmission or transfer case and then a hole or cut out 12 has to be cut into either the tail housing of the transmission or the cover of the transfer case (see eg FIG. 1) to mount the necessary speed sensor at the proper depth and angle to read the pulse counts from the reluctor ring 48. The process of drilling the hole into either the tail housing or the transfer case causes inherent weakening as both are built with precision thin wall casting for maximum strength. Any breach of the casting causes severe weakness and causes problems over time.

The transmission adapter apparatus and method of the present invention, as disclosed and described herein, provides an elegant solution to a complicated problem allowing the user to avoid damaging the elements of the equipment involved and ensuring operational effectiveness of the combination of non-congruent equipment parts.

The description of the present embodiments of the invention has been for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. In transmissions with a transmission housing and a transfer housing, a transmission adaptor apparatus comprising:
    a. an adapter with a first side and a second side, an inside and an outside, and a circumferential edge with a width surrounding a hollow center with a diameter;
    b. a speed sensor receiver in said circumferential edge from said outside to said inside with an opening from said outside into said hollow center wherein said speed sensor receiver is configured to receive and retain a speed sensor and wherein said speed sensor receiver is perpendicular to a centerline through said hollow center;
    c. a speed sensor retainer lip in said speed sensor receiver such that a speed sensor located in said speed sensor receiver is retained at a selected distance from said hollow center,
    d. holes in said adapter wherein said holes are configured to align with a transmission housing and a transfer housing; and
    e. a coupler configured to fit within the hollow center of said adapter wherein said coupler includes a first end and a second end wherein the first end is connectable with a transmission in said transmission housing and wherein the second end is connectable with a transfer case in said transfer housing.

2. The apparatus of claim 1 further including an alignment edge surrounding the hollow center on at least one side of the adapter wherein the alignment edge is configured to connect with said housings so as to align the adapter with said housings.

3. The apparatus of claim 1 wherein said coupler includes a female end and a male end.

4. The apparatus of claim 1 wherein said coupler includes two female ends.

5. The apparatus of claim 1 wherein the transmission housing includes a tail housing and wherein said transfer housing includes a front housing and wherein said coupler is connectable with the tail housing on one end and with the front housing on another end.

6. The apparatus of claim 1 wherein the speed sensor retainer lip is configured to hold a speed sensor approximately one-eighth of an inch from said hollow center.

7. The apparatus of claim 1 wherein the transmission is an ALLISON brand transmission.

8. The apparatus of claim 1 wherein the transmission is a FORD brand transmission.

9. The apparatus of claim 1 further including a tone ring wherein the tone ring is configured to fit within the adapter and rotate underneath the speed sensor receiver.

10. The apparatus of claim 1 wherein said adaptor is used with a particular type of transmission and wherein the transmission is selected from a group of transmissions consisting of: an ALLISON brand transmission and a FORD brand transmission.

11. In transmissions with a transmission housing and a transfer housing, a transmission adaptor apparatus comprising:
    a. an adapter with a first side and a second side, an inside and an outside, and a circumferential edge with a width surrounding a hollow center with a diameter,
    b. a speed sensor receiver in said circumferential edge from said outside to said inside with an opening from said outside into said hollow center wherein said speed sensor receiver is configured to receive and retain a speed sensor and wherein said speed sensor receiver is perpendicular to a centerline through said hollow center,
    c. a speed sensor retainer lip in said speed sensor receiver such that a speed sensor located in said speed sensor receiver is retained at a selected distance from said hollow center,
    d. holes in said adapter wherein said holes are configured to align with a tail housing of a transmission housing and a front housing of a transfer housing;
    e. a coupler configured to fit within the hollow center of said adapter wherein said coupler includes a first end and a second end wherein the first end is connectable with the trail housing and a transmission in said transmission housing and wherein the second end is connectable with the front housing with a transfer case in said transfer housing; and
    f. a tone ring wherein the tone ring is configured to fit within the adapter and rotate underneath the speed sensor receiver.

12. The apparatus of claim 11 further including an alignment edge surrounding the hollow center on at least one side of the adapter wherein the alignment edge is configured to connect with said housings so as to align the adapter with said housings.

13. The apparatus of claim 11 wherein said coupler includes a female end and a male end.

14. The apparatus of claim 11 wherein said coupler includes two female ends.

15. The apparatus of claim 11 wherein the speed sensor retainer lip is configured to hold a speed sensor approximately one-eighth of an inch from said hollow center.

16. A transmission adapter method comprising:
   a. providing an adapter with a first side and a second side, an inside and an outside, and a circumferential edge with a width surrounding a hollow center with a diameter, a speed sensor receiver in said circumferential edge from said outside to said inside with an opening from said outside into said hollow center wherein said speed sensor receiver is configured to receive and retain a speed sensor and wherein said speed sensor receiver is perpendicular to a centerline through said hollow center; a speed sensor retainer lip in said speed sensor receiver such that a speed sensor located in said speed sensor receiver is retained at a selected distance from said hollow center, holes in said adapter wherein said holes are configured to align with a transmission housing and a transfer housing; a coupler configured to fit within the hollow center of said adapter wherein said coupler includes a first end and a second end wherein the first end is connectable with a transmission in said transmission housing and wherein the second end is connectable with a transfer case in said transfer housing; and
   b. connecting the adapter and the coupler with the transmission and transfer case with a tone ring located in the adapter perpendicular and adjacent to said speed sensor receiver.

17. The method of claim 16 further including an alignment edge surrounding the hollow center on at least one side of the adapter wherein the alignment edge is configured to connect with said housings so as to align the adapter with said housings.

18. The method of claim 16 wherein the transmission housing includes a tail housing and wherein said transfer housing includes a front housing and wherein said coupler is connectable with the tail housing on one end and with the front housing on another end.

19. The method of claim 16 wherein the speed sensor retainer lip is configured to hold a speed sensor approximately one-eighth of an inch from said hollow center.

20. The method of claim 16 wherein said coupler includes a female end and a male end.

* * * * *